United States Patent [19]

Chenausky et al.

[11] Patent Number: 4,655,588

[45] Date of Patent: Apr. 7, 1987

[54] INJECTION CONTROLLED LASER TRANSMITTER WITH TWIN LOCAL OSCILLATORS

[75] Inventors: Peter P. Chenausky, Avon; William J. Green, Jr., Vernon, both of Conn.

[73] Assignee: The United States of America as represented by the Secretary of the Army, Washington, D.C.

[21] Appl. No.: 704,816

[22] Filed: Feb. 25, 1985

[51] Int. Cl.$^4$ ............................ G01C 3/08; H01S 3/13
[52] U.S. Cl. ........................................ 356/5; 372/32; 372/94
[58] Field of Search .................... 356/5, 28, 28.5, 350; 372/32, 94; 330/4.3; 332/7.51

[56] References Cited

U.S. PATENT DOCUMENTS 3,740,664  6/1973  Freiberg et al. ...................... 372/32
4,515,471  5/1985  Eden .................................... 356/5

Primary Examiner—L. T. Hix
Assistant Examiner—David M. Gray
Attorney, Agent, or Firm—Sheldon Kanars; Jeremiah G. Murray; Robert A. Maikis

[57] ABSTRACT

A heterodyne $CO_2$ optical Doppler radar comprising a ring type of transmitter laser and twin local oscillator lasers which are automatically controlled to operate at a difference frequency equal to the intermediate frequency of the radar, which may be in the VHF band. The output of one of the twin lasers is injected into the transmitter laser for stabilization purposes and the output of the other of the twin lasers is heterodyned with the received target return signals to form the radar's intermediate frequency signal.

6 Claims, 3 Drawing Figures

INJECTION CONTROLLED LASER TRANSMITTER WITH TWIN LOCAL OSCILLATORS

The Government has rights in this invention pursuant to Contract DAAK80-79-C-0302, awarded by the Department of the Army.

BACKGROUND OF THE INVENTION

This invention relates to optical radars in which a high power $CO_2$ laser is used as a transmitter and in which target enchoes are heterodyned with the output of a local oscillator laser to yield an intermediate frequency signal in the RF region, for example in the VHF or UHF band. The desired target information is then extracted from the intermediate frequency signal.

$CO_2$ lasers are preferred as the transmitters of optical radars because of the high electrical efficiency and high power characteristics thereof, because the emitted radiation thereof is in the infrared region at approximately 10 microns wavelength and is thus both convert and eye safe, and also because the atmospheric low-loss transmission window which exists between 8 and 14 microns makes possible long range optical transmission. High powered $CO_2$ transmitter lasers necessarily involve moderate to large Fresnel number optical cavities which have inherently unacceptable temporal and modal stability. The temporal instabilities arise when the differential optical loss among competing high order transverse and longitudinal modes is low, hence the laser oscillator indiscriminately "mode hops". Moreover, without some form of intracavity optical dispersion, a high gain $CO_2$ laser transmitter can oscillate on any number of vibrational-rotational transitions in the 9 to 11 micron spectral region, and while gratings or prisms may be employed to provide intracavity optical dispersion, these elements invariably and considerable optical loss.

These inherently unstable large $CO_2$ lasers can be stabilized or controlled by injecting into the cavity thereof a small sample of the desired frequency, wavelength and mode of operation, as long as the high power laser cavity has the required optical design to support this frequency or wavelength of oscillation. Under these conditions, the injected signal will force the higher powered device to operate on the injected transition and transverse mode. The source of the desired injection signal is usually another smaller $CO_2$ laser which, due to its smaller cavity dimensions, has much better temporal, mode and frequency stability, and which can in addition be provided with an accurate frequency stabilization system, which may include, for example, a Stark cell as an absolute frequency reference.

Heterodyne optical radars require highly stable transmitters and local oscillators. If the desired radar signature is of the Doppler type, any frequency drift between the transmitter and local oscillator will have the same effect in the intermediate frequency (IF) signal thereof as radial target movement. The prior art includes homodyne type optical radars in which a frequency stable local oscillator laser has had a portion of its output injected into the high power transmitter laser so that both lasers operate at the same frequency. Such a homodyne radar cannot distinguish the sense of radial movement of moving targets since it in effect has a zero intermediate frequency. Further, homodyne radars have the additional disadvantage that they do not produce any video signal for stationary targets and they produce only extremely low frequency video signals for targets with slow radial motion, and this limits the detection of low speed radially moving targets.

Some of these disadvantages can be overcome by injecting the output of a single local oscillator laser into the cavity of the larger $CO_2$ transmitter and selecting an axial mode therein which has a frequency different from the injected frequency. This results in a heterodyne radar with a non-zero IF which can distinguish the sense of target radial movement, but the selection or choice of the intermediate frequency is constrained by the available axial modes of the transmitter, and further it may require operation of the transmitter laser off of its line center where the output beam power is not a maximum.

In contrast with these prior art optical radars the present invention provides a more versatile heterodyne radar in which the transmitter is injection-controlled so that it operates at a highly stable frequency which is offset in frequency by a fixed and controllable amount from the local oscillator laser. The amount of frequency offset determines the intermediate frequency.

SUMMARY OF THE INVENTION

The invention comprises a heterodyne type of $CO_2$ optical radar including a frequency-stabilized first local oscillator laser with a second local oscillator laser controlled to operate at a frequency offset from that of said first local oscillator by the amount of the desired intermediate frequency of the radar set. The output of the first local oscillator is injected into the high power $CO_2$ transmitter laser for stabilization and frequency control purposes, and the output of the second local oscillator laser is heterodyned with the received target echoes to yield the intermediate frequency signal.

It is thus an object of the invention to provide a high power $CO_2$ optical radar set of the heterodyne type which comprises a highly stable, high powered transmitter and a highly stable local oscillator operating at a fixed frequency offset from said transmitter, and whereby the amount of said fixed frequency offset can be determined by the system designer in accordance with operational requirements of said radar set.

A further object of the invention is to provide a heterodyne $CO_2$ radar with a high powered, frequency stabilized transmitter laser and with twin low powered local oscillator lasers, the first of which has a portion of its output injected into said transmitter laser for stabilization purposes, and wherein the output of both of said local oscillator lasers are applied to a detector which derives the difference or beat frequency of said local oscillator lasers, said beat frequency being applied to a frequency control system which maintains the difference frequency of said twin lasers at the desired intermediate frequency of said radar, and wherein the second of said twin lasers is applied to the mixer of said radar where it is heterodyned with the received target echo return signals to produce the radar's intermediate frequency signal.

Another object of the invention is to provide a heterodyne optical Doppler radar which has an accurately controlled intermediate frequency and which can accurately permit measurement of the radial velocities as well as fine-grained Doppler signatures of moving targets, and the positions of stationary targets, if the high power transmitter thereof emits a pulsed output.

These and other objects and advantages of the invention will become apparent from the following detailed description and the drawings.

DETAILED DESCRIPTION OF A PREFERRED EMBODIMENT

Figure 1:
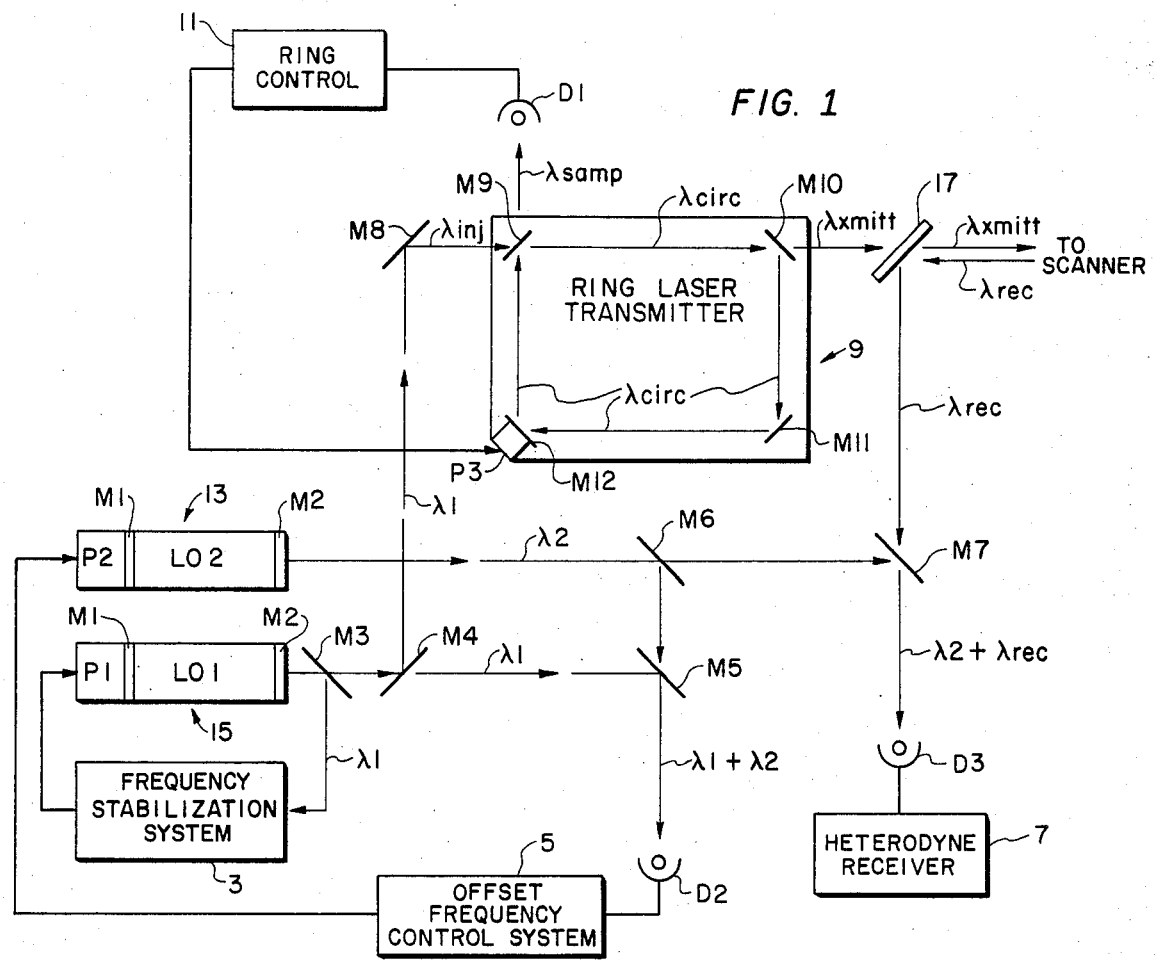
FIG. 1 is a schematic diagram of the invention which includes a ring laser transmitter.

It is preferred that the transmitter laser of the optical radar of this invention be of the ring type since it is more convenient to inject a control laser beam into such a laser and because the ring resonator is directionally isolated from the injection source. The diagram of FIG. 1 shows a heterodyne type of optical radar with such a $CO_2$ ring laser, 9, as the transmitter thereof. Such a laser resonator comprises four separate mirrors, M9–M12, arranged at the corners of a rectangle (or square), with the intracavity optical path arranged along the rectangle sides between the mirrors. The four arrows labelled $\lambda_{circ}$ indicates the circulating optical flux within the ring laser 9. The partially reflective mirror M9 permits the injection laser beam $\lambda_{inj}$ from the first local oscillator 15 to enter the laser 9. Mirror M9 also permits a sample of the circulating flux, $\lambda_{samp}$, to exit the ring and actuate detector D1 which is part of an automatic loop length control servo which maximizes the transmitter optical flux by adjusting the transducer P3, which is attached to and drives mirror M12. The detector D1 converts the sampled laser beam to an electrical signal and applies the signal to ring control circuit 11, which has its output connected to P3. The ring control circuit may comprise, for example, a hill climbing servo which adjusts the position of mirror M12 through P3 until maximum laser power is achieved. This will occur when the total length of the ring laser is an integral number of wavelengths of the line center frequency.

The partially reflective mirror M10 is the front or output mirror of the transmitter laser and the output beam, $\lambda_{xmitt}$, passes therethrough and thence through duplexer 17 to a scanner (not shown) which deflects or scans the beam in a desired manner. It should be noted that in the laser 9, the wavelengths indicated by the sumbols $\lambda_{inj}$, $\lambda_{circ}$, $\lambda_{samp}$, and $\lambda_{xmitt}$, are all the same wavelength. As stated above, the injected laser beam from the first local oscillator causes the inherently unstable high powered transmitter laser to oscillate on a single transverse and longitudinal mode and at a stable frequency of the desired optical transition determined by the frequency of the first local oscillator. With the injection system, no dispersive optical element is needed in the high powered device.

The first local oscillator 15 comprises a laser cavity defined by rear mirror M1 mounted on and driven by length-controlling transducer P1, and partially reflective front mirror M2. The laser is provided with a prior art type of frequency stabilization system, 3, which receives a sample of the laser's output reflected from mirror M3. The system 3 controls the position of mirror M1 via transducer P1 to achieve the desired wavelength, $\lambda_1$. The system 3 may for example comprise a frequency reference in the form of a Stark cell which determines and controls the oscillating frequency of the laser 15. Such a Stark cell stabilization system is shown and described in detail in a co-pending application entitled FREQUENCY STABILIZED LASER, Ser. No. 639,558, filed on Aug. 10, 1984.

A portion of the output of first local oscillator 15 is reflected from partially reflective mirror M4 to mirror M8 and thence into the ring laser 9, as explained above. The second local oscillator 13 is similar to the first one and includes a rear mirror M1 attached to and driven by length-controlling transducer P2. The laser output beam at wavelength $\lambda_2$ passes through front mirror M2. A portion of this output is reflected from mirror M6 and passes through mirror M5 to detector D2, together with a sample of the output of the first local oscillator which is reflected from M5 to D2. The wavelengths of the two local oscillators are arranged to differ in frequency by the desired intermediate frequency of the heterodyne radar. The laser cavity cross sections, the lasing medium, $CO_2$, and the $CO_2$ pressures of the two local oscillators may be identical but the cavity lengths will, for example, be controlled so that they operate at different axial modes within the same line, to yield a frequency difference or frequency offset in the RF region, for example at 150 megaHz. A servo system comprising the detector D2, offset frequency control system 5, and length-controlling transducer P2 attached to rear mirror M2 of the second local oscillator 13, maintains the desired offset frequency at a constant value. The two local oscillator laser beams at wavelengths $\lambda_1$ and $\lambda_2$ applied to detector D2 produce therein an electrical difference or beat frequency which is applied to the circuitry 5, which may, for example, include a frequency discriminator of the Foster-Seeley type having a center frequency equal to desired offset or intermediate frequency. The error signal produced by the discriminator will adjust the transducer P2 in such a direction as to maintain the frequency offset or difference between the two local oscillators at a constant fixed value equal to the discriminator center frequency.

The output of the second local oscillator 13 is mixed with the received laser target echoes to generate the intermediate frequency. The target echoes, labelled $\lambda_{rec}$, pass through the scanner (not shown) and are reflected by the duplexer 17, pass through partially reflective mirror M7 and thence to detector or mixer D3. A portion of the output of the second local oscillator 13 at wavelength $\lambda_2$ passes through mirror M6 and is reflected from mirror M7 to D3. The heterodyne receiver 7 is connected to the output of D3 and this receiver comprises one or more intermediate frequency stages turned to the offset frequency between the two local oscillators. This frequency is $c/\lambda_1 - c/\lambda_2$. The intermediate frequency stages within the receiver 7 would be followed by a second detector and/or Doppler frequency processing circuitry, and some sort of display device for target information.

The target returns from stationary targets will be unchanged in frequency from the transmitter signal. Targets which are moving radially inward along the transmitted beam will cause increases in the target return frequency and consequent shortening of the received wavelength, $\lambda_{rec}$. Outwardly moving targets would have the opposite effect on received wavelength. These Doppler frequency shifts yield basic information regarding moving targets. Frequency stable lasers are essential to an accurate optical Doppler radar since any frequency drift of either the transmitter of the local oscillator lasers will cause a frequency error in the intermediate frequency signal which may be interpreted as target movement by the Doppler processing circuitry of the heterodyne receiver 7.

Figure 3:
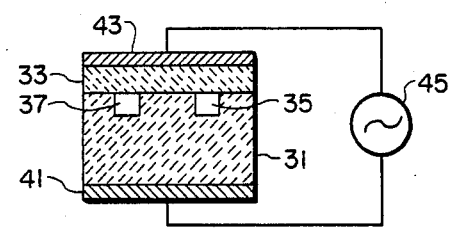
FIG. 3 shows one embodiment of the twin local oscillator lasers.

The twin local oscillators 13 and 15 may conveniently be of the waveguide type formed in a common ceramic block. FIG. 3 is a cross sectional view of such twin waveguide lasers. The ceramic block 31 has a pair of parallel channels 35 and 37 formed in one surface thereof. Another ceramic block or plate 33 is bonded to the top of block 31 to form the two laser cavities. The cavities 35 and 37 would then be filled with the lasing medium and appropriate excitation provided. The twin lasers may comprise cavities approximately 15 cm long with square cross sections 2.25 mm on a side, filled with $CO_2$-$N_2$-He gas mixture at a total pressure of 90 torr. Such lasers are capable of producing 7 watts of continuous wave laser power. These types of twin lasers can, by virtue of their high degree of electrical, mechanical and optical commonality, maintain a stable difference frequency of 100 MHz to within 30 KHz for period of seconds without using active stabilization systems. The twin lasers of FIG. 3 may be provided with a common RF excitation source by means of two planar electrodes 41 and 43 applied to the bottom of ceramic block 31 and to the top of ceramic cover 33, as shown. The RF excitation generator 45 has its output connected across these electrodes to provide a transverse field within the laser cavities.

The high power ring laser 9 may comprise four gain sections arranged in a rectangle, square or X-configuration with a total peripheral gain length of approximately 148 cm, with the cavity cross sections being square with 2.25 mm sides and filled with a $CO_2$-$N_2$-He gas mixture at 100 torr total pressure. Such a laser with suitable excitation is capable of producing a continuous output beam of approximately 90 watts.

Figure 2:
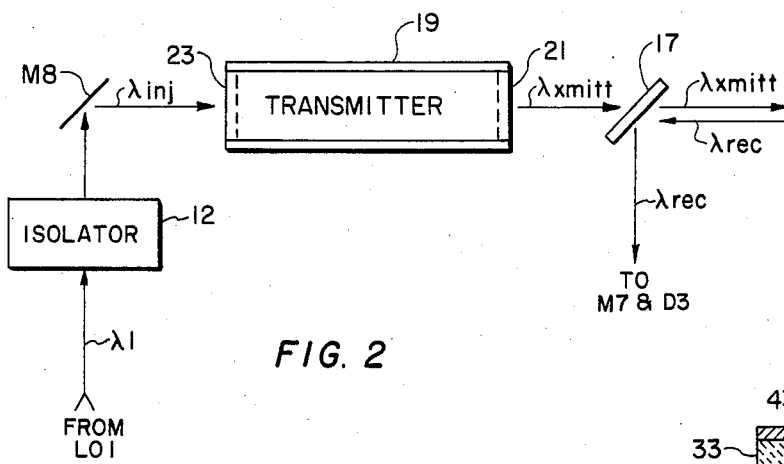
FIG. 2 shows how a conventional linear transmitter can be used in the circuit of FIG. 1.

The embodiment of FIG. 2 utilizes a conventional non-ring or linear laser 19 as the transmitter. This transmitter comprises a single cavity with mirrors 21 and 23 at each end thereof. Both of these mirrors are partially reflective so that the laser output can pass through front mirror 21 to duplexer 17 and the injection laser beam from the first local oscillator can be injected through rear mirror 23, after reflection from M8. An isolator 12 is placed in the path of the injection beam to prevent retroreflection of the output of the transmitter laser back to the first local oscillator.

While the invention has been described in connection with illustrative embodiments, obvious variation therein will occur to those skilled in the art without the exercise of invention, accordingly the invention should be limited only by the scope of the appended claims.

What is claimed is:

1. A heterodyne $CO_2$ Doppler radar comprising a frequency-stabilized first local oscillator laser and a second local oscillator laser automatically controlled to operate at a frequency offset from that of said first local oscillator laser by the amount of the desired intermediate frequency of the said radar, said radar further comprising an inherently unstable, high powered $CO_2$ tansmitter laser which is injection-stabilized for single frequency operation by said first local oscillator laser, said radar further comprising a mixer and heterodyne receiver connected to said mixer, the received target echoes and a portion of the output of said second local oscillator laser being applied to said mixer, and wherein said heterodyne receiver comprises an intermediate frequency channel plus intermediate frequency signal processing circuitry.

2. The radar of claim 1 wherein said transmitter laser is a ring laser which produces continuous wave power of approximately 90 watts and said first and second local oscillators are lower powered $CO_2$ lasers of high inherent frequency, mode and temporal stability.

3. The radar of claim 2 wherein said ring laser comprises a ring control servo system for maximizing the power output thereof.

4. The radar of claim 1 wherein said first local oscillator laser is frequency stabilized by means of a servo system which includes a Stark cell as a frequency reference.

5. A heterodyne $CO_2$ optical radar comprising a high powered, inherently unstable transmitter laser of the ring type, a mixer, and twin local oscillator lasers, the first of which has a portion of its output injected into said transmitter laser for stabilization purposes, and wherein the outputs of both of said twin lasers are applied to a detector which derives the difference or beat frequency of said twin lasers, said beat frequency being applied to a frequency control system which maintains the difference frequency of said twin lasers at the desired intermediate frequency of said radar, and wherein the output of the second of said twin lasers is applied to said mixer together with the received target echoes to produce the radar's intermediate signal.

6. The radar of claim 5 wherein the cavities of said twin lasers are formed by two parallel channels machined into a single block of ceramic material and wherein said parallel channels are energized from a single electrical excitation source.

* * * * *